United States Patent
Wells

(10) Patent No.: US 12,345,285 B2
(45) Date of Patent: Jul. 1, 2025

(54) CLAM SHELL INSERT UTILITY

(71) Applicant: THE YOUNG ENGINEERS, INC., Lake Forest, CA (US)

(72) Inventor: Patrick W. Wells, Irvine, CA (US)

(73) Assignee: THE YOUNG ENGINEERS, INC., Lake Forest, CA (US)

( * ) Notice: Subject to any disclaimer, the term of this patent is extended or adjusted under 35 U.S.C. 154(b) by 0 days.

(21) Appl. No.: 18/140,242

(22) Filed: Apr. 27, 2023

(65) Prior Publication Data

US 2023/0407902 A1    Dec. 21, 2023

Related U.S. Application Data

(63) Continuation of application No. 15/929,617, filed on May 13, 2020, now Pat. No. 11,644,058.

(51) Int. Cl.
    *F16B 37/04*      (2006.01)
    *F16B 5/01*      (2006.01)
    *F16B 37/06*      (2006.01)

(52) U.S. Cl.
CPC .............. *F16B 37/044* (2013.01); *F16B 5/01* (2013.01); *F16B 37/043* (2013.01); *F16B 37/061* (2013.01)

(58) Field of Classification Search
CPC ........ F16B 37/044; F16B 5/01; F16B 37/043; F16B 37/061
See application file for complete search history.

(56) References Cited

U.S. PATENT DOCUMENTS

| | | |
|---|---|---|
| 2,235,078 A | 3/1941 | Meisterhans |
| 2,764,886 A | 10/1956 | Wiesmann |
| 3,018,565 A | 2/1963 | Rohe |
| 3,213,914 A | 10/1965 | Baumle et al. |
| 3,313,078 A | 4/1967 | Rohe |
| 3,339,609 A | 9/1967 | Cushman |
| 3,493,025 A | 2/1970 | La Londe et al. |
| 3,504,723 A | 4/1970 | Cushman et al. |
| D218,674 S | 9/1970 | Emest |
| 3,621,557 A | 11/1971 | Cushman et al. |
| 3,646,981 A | 3/1972 | Barnes |
| 3,646,982 A | 3/1972 | Cushman |
| 3,662,805 A | 5/1972 | Sygnator |
| 3,695,324 A | 10/1972 | Gulistan |
| 3,964,531 A | 6/1976 | Schenk |
| 4,121,963 A | 10/1978 | Yardley et al. |
| 4,185,438 A | 1/1980 | Fischer |
| 4,227,561 A | 10/1980 | Molina |
| 4,341,053 A | 7/1982 | Dettfurth et al. |
| 4,417,028 A | 11/1983 | Azevedo |
| 4,428,705 A | 1/1984 | Gelhard |
| D278,594 S | 4/1985 | Lye |
| 4,509,308 A | 4/1985 | Dettfurth et al. |
| 4,752,171 A | 6/1988 | Pliml, Jr. |

(Continued)

*Primary Examiner* — David M Upchurch
(74) *Attorney, Agent, or Firm* — Norton Rose Fulbright US LLP

(57) ABSTRACT

A honeycomb sandwich panel insert that includes a housing defined by two identical halves which when joined together form a distal flange having opposed potting holes, and a central internal bore. Each of the halves includes an integrally formed laterally extending member that when joined forms a tight closed distal end of said bore. A nut is disposed within the internal bore of the housing and configured to float therein.

20 Claims, 5 Drawing Sheets

(56) References Cited

U.S. PATENT DOCUMENTS

| | | |
|---|---|---|
| 4,812,193 A | 3/1989 | Gauron |
| 4,817,264 A | 4/1989 | Worthing |
| 4,846,612 A | 7/1989 | Worthing |
| 4,902,180 A | 2/1990 | Gauron |
| 4,973,208 A | 11/1990 | Gauron |
| 4,993,902 A | 2/1991 | Hellon |
| D322,929 S | 1/1992 | Abbestam et al. |
| 5,082,405 A | 1/1992 | Witten |
| 5,092,725 A | 3/1992 | Aittama |
| 5,240,543 A | 8/1993 | Fetterhoff et al. |
| 5,302,069 A | 4/1994 | Toth et al. |
| 5,322,208 A | 6/1994 | Hinrichs et al. |
| 5,378,099 A | 1/1995 | Gauron |
| 5,431,578 A | 7/1995 | Wayne |
| 5,437,750 A | 8/1995 | Rinse et al. |
| D364,882 S | 12/1995 | Junkers |
| 5,553,984 A | 9/1996 | Smith |
| 5,632,582 A | 5/1997 | Gauron |
| 5,840,147 A | 11/1998 | Grimm |
| 5,840,149 A | 11/1998 | Tokunaga et al. |
| 5,843,265 A | 12/1998 | Grimm |
| 5,947,518 A | 9/1999 | Redman et al. |
| 6,096,253 A | 8/2000 | Aretz |
| 6,146,071 A | 11/2000 | Norkus et al. |
| 6,153,035 A | 11/2000 | Van Laeken |
| 6,217,695 B1 | 4/2001 | Goldberg et al. |
| 6,264,412 B1 | 7/2001 | Nakamura et al. |
| 6,273,985 B1 | 8/2001 | DeLouise et al. |
| 6,278,562 B1 | 8/2001 | Lovett |
| 6,299,596 B1 | 10/2001 | Ding |
| D452,428 S | 12/2001 | Shinjo et al. |
| D453,000 S | 1/2002 | Shinjo et al. |
| 6,350,093 B1 | 2/2002 | Petersen et al. |
| D454,057 S | 3/2002 | Pamer et al. |
| D457,054 S | 5/2002 | Pamer et al. |
| 6,485,130 B2 | 11/2002 | DeLouise et al. |
| 6,488,460 B1 | 12/2002 | Smith et al. |
| 6,692,206 B1 | 2/2004 | Clinch et al. |
| 6,733,221 B2 | 5/2004 | Linger |
| 6,758,645 B2 | 7/2004 | Curley, Jr. et al. |
| D499,010 S | 11/2004 | Velten |
| 6,811,363 B1 | 11/2004 | Minnich |
| D519,530 S | 4/2006 | Thysell et al. |
| D520,856 S | 5/2006 | Osiecki et al. |
| D520,859 S | 5/2006 | Osiecki et al. |
| 7,124,821 B2 | 11/2006 | Clinch et al. |
| D534,796 S | 1/2007 | Falkenburg |
| 7,192,231 B2 | 3/2007 | Blackaby |
| D545,584 S | 7/2007 | Hunziker |
| D549,091 S | 8/2007 | McIntyre et al. |
| D551,269 S | 9/2007 | Burke, III |
| D557,132 S | 12/2007 | Chinjo |
| D572,302 S | 7/2008 | Peavey |
| D604,611 S | 11/2009 | Ames et al. |
| D634,343 S | 3/2011 | Burke, III |
| 8,029,221 B2 | 10/2011 | Curley, Jr. et al. |
| D662,869 S | 7/2012 | Ballard |
| D668,919 S | 10/2012 | Teng |
| D684,455 S | 6/2013 | Relyea et al. |
| D690,581 S | 10/2013 | Brander |
| D693,669 S | 11/2013 | Kousens et al. |
| D703,524 S | 4/2014 | Sakoda |
| D704,044 S | 5/2014 | Makino |
| 9,003,662 B2 | 4/2015 | Burd et al. |
| 9,109,615 B2 | 8/2015 | Cuddy et al. |
| 9,234,536 B2 | 1/2016 | Truong et al. |
| 9,702,394 B2 | 7/2017 | Barney et al. |
| 9,822,808 B2 | 11/2017 | Rajeev |
| 10,113,579 B2 * | 10/2018 | Balderrama ......... F16B 31/021 |
| 2004/0005205 A1 | 1/2004 | Yake et al. |
| 2005/0169727 A1 | 8/2005 | Cosenza |
| 2008/0292425 A1 * | 11/2008 | Pineiros ............... F16B 37/044 |
| | | 411/92 |
| 2013/0078052 A1 * | 3/2013 | Degner ................. F16B 5/025 |
| | | 411/106 |
| 2016/0186796 A1 | 6/2016 | Verdier |
| 2017/0167523 A1 | 6/2017 | Davis |
| 2017/0268560 A1 | 9/2017 | Barney et al. |
| 2018/0038399 A1 | 2/2018 | Fischer et al. |
| 2018/0298936 A1 * | 10/2018 | Bräutigam .......... B60Q 1/0686 |

* cited by examiner

CLAM SHELL INSERT UTILITY

CROSS-REFERENCED TO RELATED APPLICATIONS

This application is a continuation of U.S. application Ser. No. 15/929,617, filed May 13, 2020, the contents of which is incorporated into the present application in its entirety.

BACKGROUND OF INVENTION

The interior of commercial passenger aircraft typically includes honeycomb core panels. Various devices and fixtures are attached to the honeycomb panel. In order to secure such attachments to the honeycomb core, fastener panel inserts are potted into an opening formed in the honeycomb panel using a potting material. The fastener insert has a hollow shaft, the bore of which contains female threads which are adapted to engage a male threaded screw fastener. Because it can be difficult to align the screw with the female threads, fastener inserts have been developed which are often provided with a floating nut containing the female threads which is introduced into the open or distal end of the housing of the fastener insert. The end is then capped off to prevent the flow of potting material into the female threaded portion.

Examples of known panel inserts having floating nuts are disclosed in U.S. Pat. Nos. 4,973,208, 5,632,582, 7,195,436 and U.S. Pat. App. Pub. No. 2018/0038399 A1.

The present invention affords a floating sandwich panel insert which does not involve assembly through the distal end of the housing and the use of a separate end cap. This is accomplished by a clam-shell like housing formed of two identical halves and provided with engaging elements which can be snapped together around the floating nut.

BRIEF SUMMARY OF THE INVENTION

The present invention relates to a honeycomb sandwich panel insert comprising a housing defined by two identical halves which when joined together form a distal flange having opposed potting holes, and a central internal bore, integrally formed laterally extending member when joined forms a tight closed distal end of said bore, a nut disposed within the internal bore of the housing and configured to float therein, the nut defining a truncated flange and a hollow shaft extending from the truncated flange, the hollow shaft defining internal female threads adapted to receive a male threaded screw, the truncated flange being received at the closed distal end of said bore to prevent rotation of said nut in said bore, each of said halves having an abutting surface, at least one lateral peg projecting from said abutting surface and at least one hole in said abutting surface, said peg and hole being positioned whereby when said halves are joined, a peg in one half is received in a hole in the other half by a snap fit.

BRIEF DESCRIPTION OF THE DRAWINGS

Turning to the drawings.

DETAILED DESCRIPTION OF THE PREFERRED EMBODIMENTS

Figure 1:
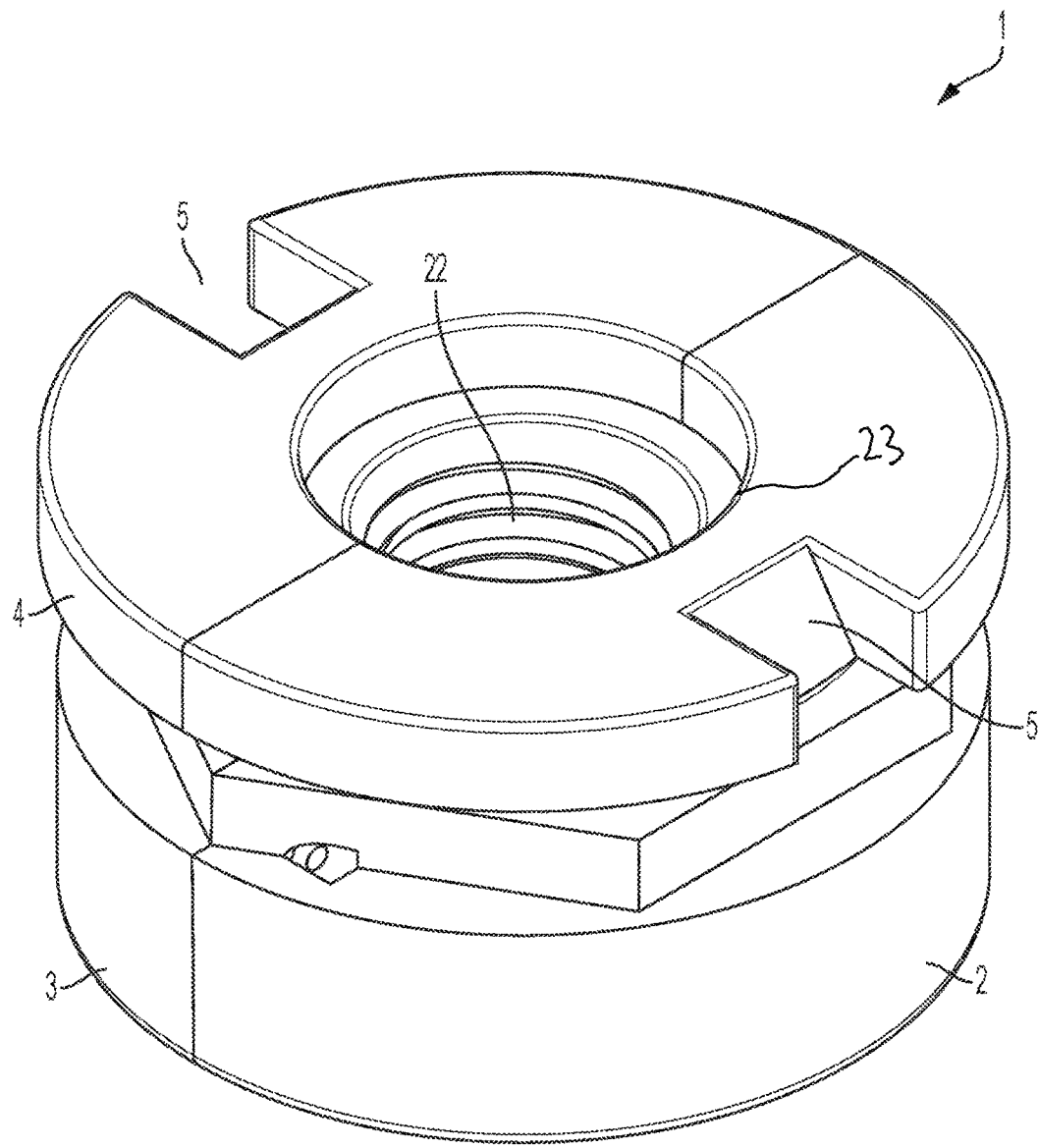
FIG. 1 is a perspective view of an embodiment of floating sandwich panel insert of the invention showing the halves joined around the nut.
Figure 2:
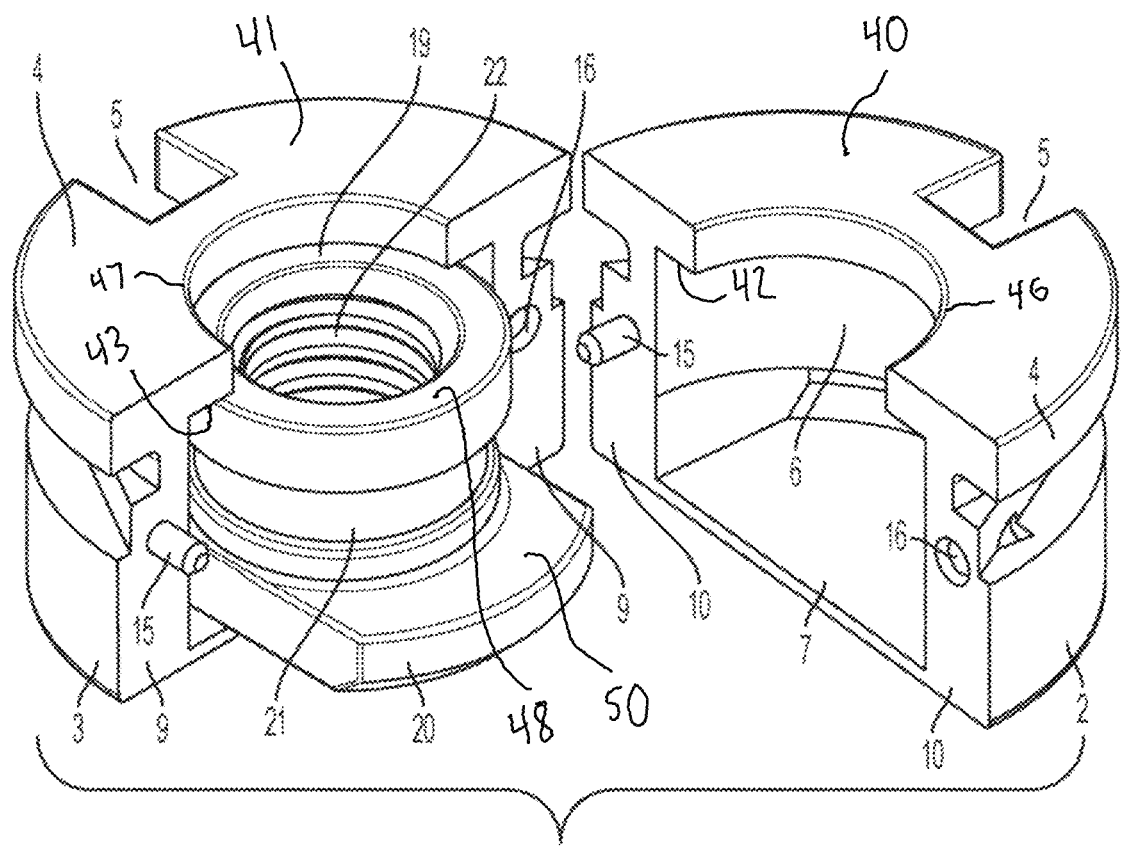
FIG. 2 is a perspective view of an embodiment of the floating sandwich panel insert of the invention having two halves and the nut in which each of the halves has on abutting surfaces one peg and one hole for receiving the peg.
Figure 3:
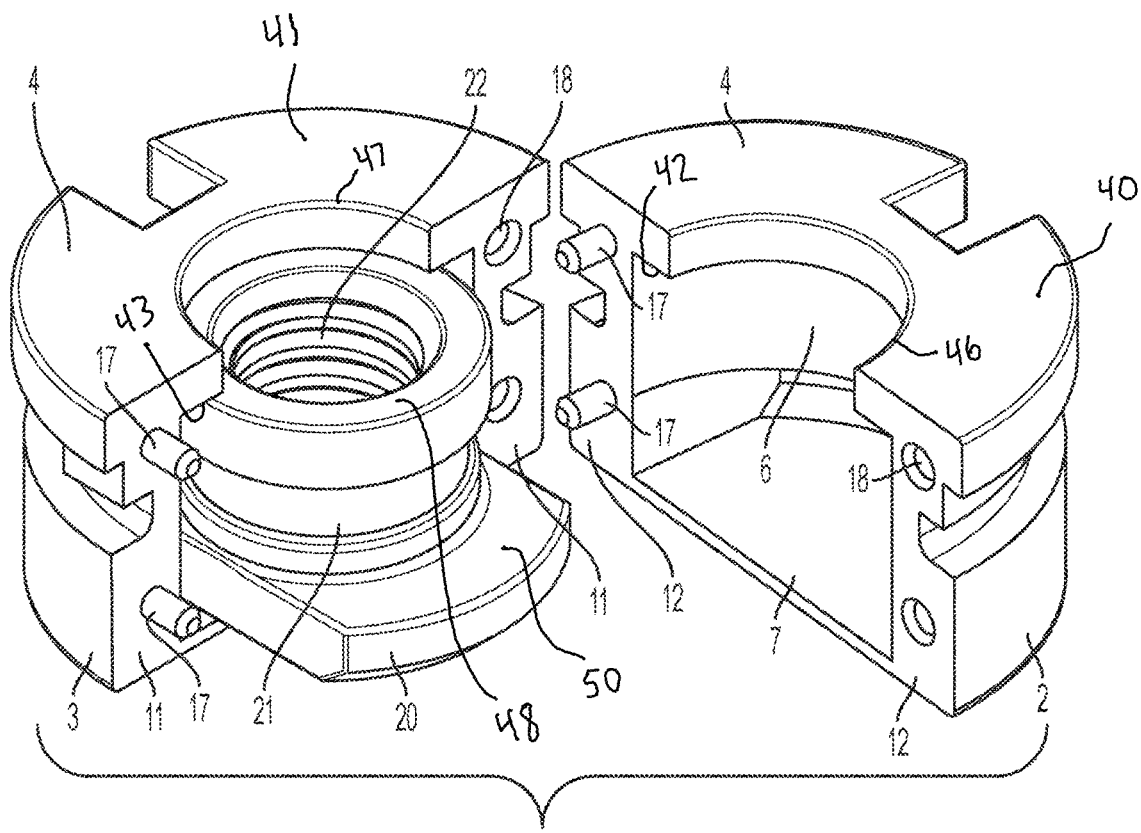
FIG. 3 is a perspective view of another embodiment of the sandwich panel insert of the invention having two halves and the nut in which each half has on abutting surfaces two pegs and two holes for receiving the pegs.
Figure 4:
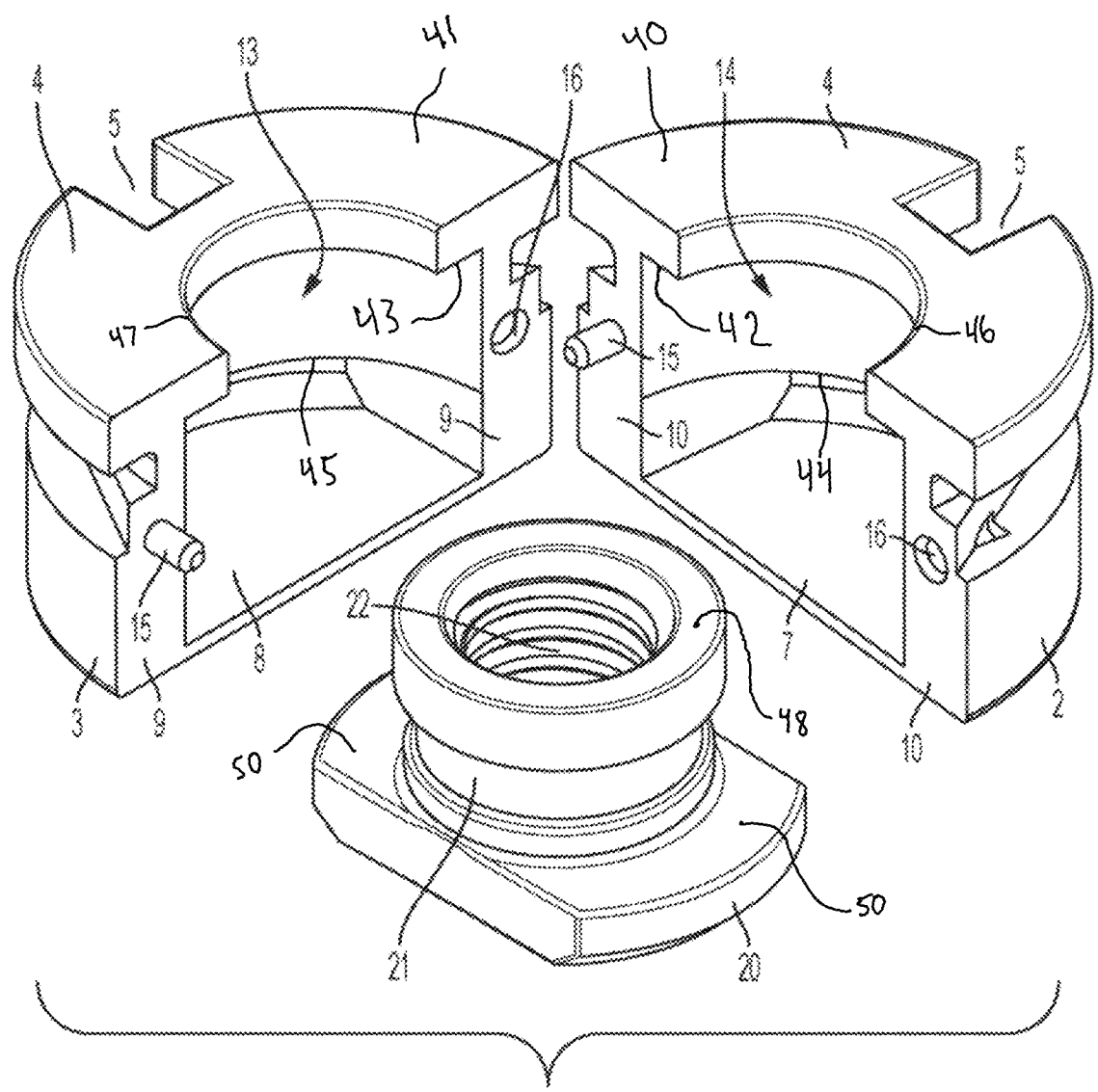
FIG. 4 shows the embodiment of the floating sandwich panel insert of FIG. 2 completely disassembled.
Figure 5:
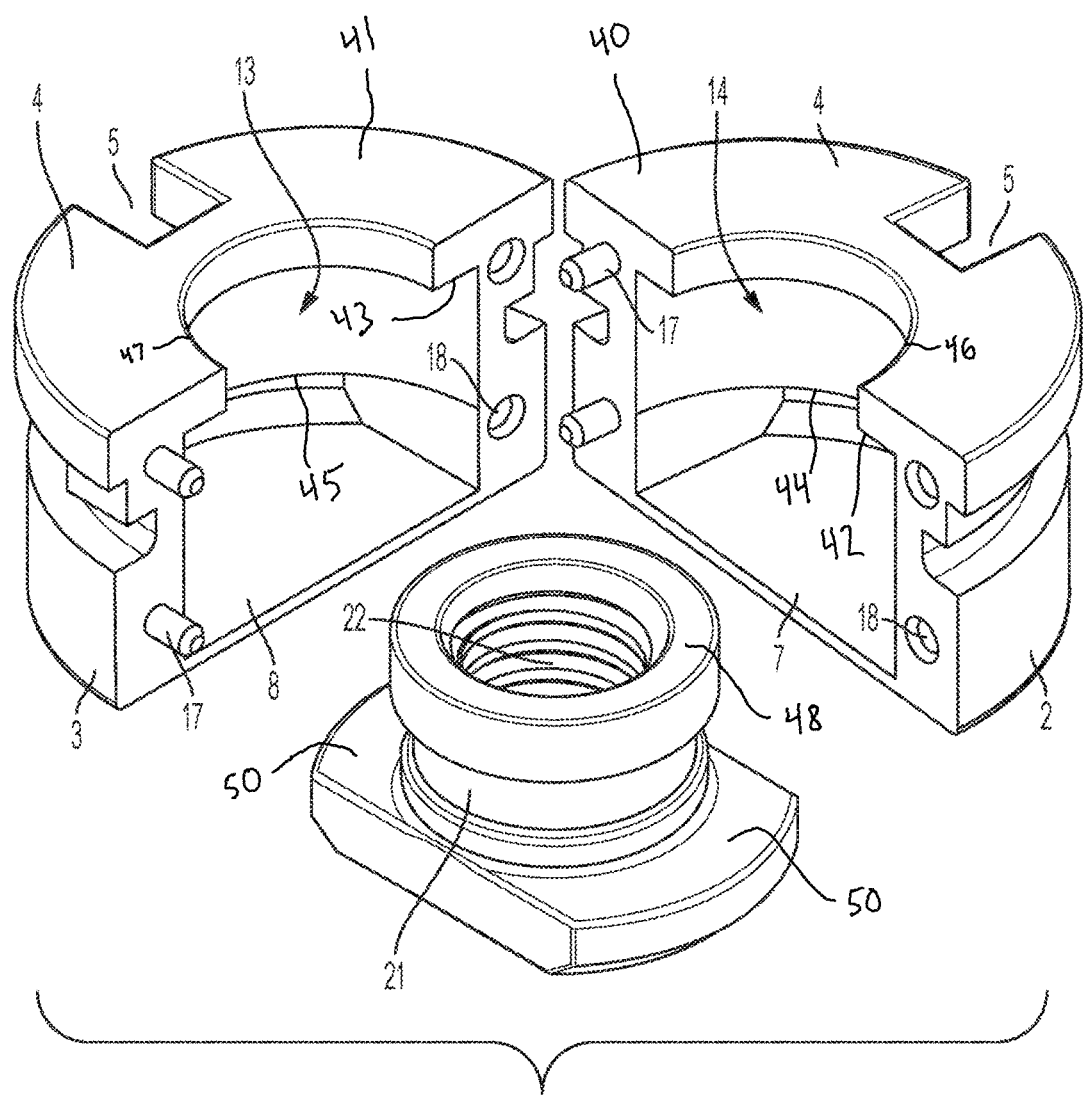
FIG. 5 shows the embodiment of the floating sandwich panel insert of FIG. 3 completely disassembled.

Turing to the drawings in more detail, the floating sandwich panel insert 1 of this invention includes a housing formed of two identical halves 2 and 3 which at the top or open end of the insert form an annular lateral distal flange 4 when the two halves are joined or closed on each other like a clamshell. The thus formed annular lateral distal flange is provided with slots or holes 5 for the introduction of potting material. Each of the halves 2 and 3 when joined forms a central internal bore 6. Each of the halves 2 and 3 has a laterally extending member 7 and 8 when joined forms a tight closed end of the bore 6. Members 7 and 8 are integrally formed with and are part of halves 2 and 3, respectively. Each of the halves 2 and 3 have abutting surfaces or faces 9 and 10 in the embodiment of FIGS. 2 and 4. Faces or abutting surfaces 11 and 12 are shown in the embodiment of FIGS. 3 and 5. The faces are at the side of the half bores 13 and 14. In the embodiment of FIGS. 2 and 4 each of the halves' faces has a single laterally projecting peg 15 and a single hole 16. In the embodiment of FIGS. 2 and 4, the faces abut when the halves 2 and 3 are joined by the engagement of the peg 15 on one of the halves with the hole 16 on the other half to form the closed insert housing.

In an alternate and preferred embodiment, there are two pegs 17 and two holes 18 on each of the faces as shown in FIGS. 3 and 5. The engagement of the pegs and holes on the faces to form the closed housing is as described above.

In either case, the faces provide abutting surfaces whereby when said halves are joined the peg or pegs are received in the hole or holes by a snap fit.

The honeycomb sandwich panel inserts of this invention include the two halves 2 and 3 that comprise the housing. Each of the two halves 2 and 3 include a respective set of outer surfaces that are exterior to the bore 6. The sets of outer surfaces include an outer surface 40 and 41, respectively, that when joined together form an opening 23 to the central internal bore 6. For instance, the outer surfaces 40, 41 each form a respective portion 46, 47 of the opening 23. The outer surfaces 40, 41 face away from the laterally extending members 7, 8. Each of the two halves 2 and 3 further include a respective set of inner surfaces. The sets of inner surfaces include inner surfaces 42, 44 and 43, 45, respectively, that face toward the laterally extending members 7, 8. Since the two halves 2 and 3 are identical, only one injection mold tooling die set is required to make each insert size. Prior embodiments that utilize a housing and a cap require two separate die sets.

Since the two halves 2 and 3 that comprise the housing are identical and are designed to press fit together, they can be easily assembled using automated equipment.

The inserts of this invention are stronger than prior inserts (in shear, tensile and/or torque testing), as the weakest member of prior inserts consisted of the cap. The present invention eliminates the cap element and allows the strength to be increased by designing the part to allow maximum material in the critical areas of the housing.

The two identical halves 2 and 3 of the clam shell-like housing are made of a thermoplastic polymeric material. Preferably, the abutting faces 9 with 10 and 11 with 12 are fused or welded to each other by the application of sonic energy which melts and fuses the polymeric material forming the housing.

The post-assembly welding operation can be automated. Energy directors can be added to half of the abutting surfaces or faces (resulting in the entire abutting surfaces having said energy directors when the two halves are pressed together) to aid in the effectivity of the sonic welding operation, and adding to the strength of the resultant insert assembly.

The nut 19 is received in the bore 6 of the housing and configured to float therein, and has a truncated flange 20 and a hollow shaft 21 extending from the truncated flange 20. The hollow shaft 21 includes a surface 48 and has internal female threads 22 adapted to receive a threaded portion 32 of a male threaded screw 30. The surface 48 faces toward the inner surfaces 42, 43 when the two halves 2 and 3 are joined around the nut 19 in the bore 6. When the threaded portion 32 of the male threaded screw 30 and the internal female threads 22 are sufficiently engaged, the surface 48 and the inner surfaces 42, 43 apply opposing forces to one another. The truncated flange 20 is received in recessed portions of each of the halves 2 and 3 at the closed distal end of bore 6 which prevents the-rotation of the nut within the bore. For instance, FIGS. 2 and 3 show the nut 19 positioned relative to the half 3 such that one side of the truncated flange 20 is disposed within the recessed portion of the half 3. The recessed portions include the inner surfaces 44 and 45, respectively (FIGS. 4 and 5). The truncated flange 20 includes a surface 50 that faces toward the inner surfaces 44, 45 when the two halves 2 and 3 are joined around the nut 19 in the bore 6. When the threaded portion 32 of the male threaded screw 30 and the internal female threads 22 are sufficiently engaged, the surface 50 and the inner surfaces 44, 45 apply opposing forces to one another.

What is claimed is:

1. A system comprising:
   a housing including:
      a first set of outer surfaces including a first outer surface that defines an opening of a cavity; and
      a set of inner surfaces including a first inner surface that faces the opening, and a second inner surface and a third inner surface that each face the first inner surface, wherein the first inner surface faces the second inner surface; and
   a nut positioned in the cavity, the nut including:
      a shaft portion including a first nut surface that faces the second inner surface; and
      a flange portion including a second nut surface that faces the third inner surface.

2. The system of claim 1, where the nut is configured to receive a threaded component via the opening.

3. The system of claim 2, where:
   the shaft portion of the nut includes an internally threaded portion configured to receive a threaded portion of the threaded component.

4. The system of claim 2, where, during insertion of the threaded component into the nut and rotation of the threaded component to engage the nut, a force is applied from the nut on the housing in a direction towards the opening.

5. The system of claim 4, where the direction of the force is parallel to a longitudinal axis of the nut, a longitudinal axis of the housing, or a combination thereof.

6. The system of claim 4, where, during rotation of the threaded component to engage the nut, rotation of the nut is restricted by the housing.

7. The system of claim 4, where the force is distributed:
   across the first nut surface;
   across the second nut surface; or
   a combination thereof.

8. The system of claim 4, where the force is applied:
   from the first nut surf ace to the second inner surface;
   from the second nut surf ace to the third inner surf ace; or
   a combination thereof.

9. The system of claim 1, where:
   the housing has a longitudinal axis;
   the first inner surface includes a bottom surface of the cavity;
   the first inner surface is coplanar with a first transverse plane of the housing;
   the second inner surface is coplanar with a second transverse plane of the housing;
   the third inner surface is coplanar with a third transverse plane of the housing; or
   a combination thereof.

10. The system of claim 1, where:
    the nut has a longitudinal axis;
    the first nut surface is coplanar with a first transverse plane of the nut;
    the second inner surface is coplanar with a second transverse plane nut; or
    a combination thereof.

11. The system of claim 1, where:
    the flange portion extends in:
       a first direction into a first recesses of the cavity of the housing; and
       a second direction into a second recess of the cavity of the housing, the first direction opposite the first direction; and
    the shaft portion extends from the flange portion in a third direction that is orthogonal to each of the first direction and the second direction.

12. The system of claim 1, where the housing includes a first portion and a second portion, and where the cavity is formed when the first portion and the second portion are connected together.

13. The system of claim 1, where:
    the flange portion includes a third nut surface;
    the first nut surface is a top surface of the shaft portion;
    the second nut surface is a top surface of the flange portion;
    the third nut surface is a bottom surface of the flange portion; and
    the shaft portion extends from the second nut surface of the flange portion such that the second nut surface is positioned between the first nut surface and the third nut surface.

14. An apparatus comprising:
    a first housing portion of a housing, the first housing portion configured to mate with a second housing portion of the housing such that, when the first housing portion and the second housing portion are mated together:
       the housing includes:
          an outer surface defined by the first housing portion and the second housing portion, the outer surface defines an opening of a cavity of the housing; and
          a set of inner surfaces including a first inner surface that faces the opening, and a second inner surface and a third inner surface that each face the first inner surface, wherein the first inner surface faces the second inner surface; and a nut is positioned in the cavity, the nut including:
   a shaft portion including a first nut surface that faces the second inner surface; and
   a flange portion including a second nut surface that faces the third inner surface; and where, when the nut is positioned in the cavity, the nut is configured to receive a threaded component such that rotation of the threaded component to engage the nut causes the nut to apply a force on the housing in a direction towards the opening, the force distributed across the first nut surface and the second nut surface.

15. The apparatus of claim 14, further comprising:
the second housing portion of the housing coupled to the first housing portion of the housing; and
the nut.

16. The apparatus of claim 15, where:
the first housing portion includes:
   a first recess configured to receive a first portion of the flange portion of the nut and, when the nut is positioned in the cavity, to restrict rotation of the nut; and
   a portion of each of the first inner surface, the second inner surface, and the third inner surface.

17. A method comprising:
providing a housing and a nut, the housing including a first portion of the housing coupled to a second portion of a housing, the housing defining an opening of a cavity of the housing, the nut positioned in the cavity and accessible via the opening defined by the housing, and the nut including a shaft portion including a first nut surface that faces the opening and a flange portion including a second nut surface that faces the opening, wherein the housing includes a first inner surface, a second inner surface that faces the first nut surface, and a third inner surface that faces the second nut surface, and wherein the first inner surface faces the second and third inner surfaces; and inserting a threaded component into the nut via the opening and rotating the threaded component to engage the threaded component with the nut; and where inserting and rotating the threaded component causes the nut to apply a force on the housing in a direction towards the opening, where the force is distributed across the first nut surface and the second nut surface.

18. The method of claim 17, where the force is distributed evenly across the first nut surf ace and the second nut surface.

19. The method of claim 17, where the force includes a clamping force.

20. The method of claim 19, further comprising:
removing the threaded component from engagement with the nut.

* * * * *

UNITED STATES PATENT AND TRADEMARK OFFICE
CERTIFICATE OF CORRECTION

PATENT NO. : 12,345,285 B2
APPLICATION NO. : 18/140242
DATED : July 1, 2025
INVENTOR(S) : Patrick W. Wells Page 1 of 1

It is certified that error appears in the above-identified patent and that said Letters Patent is hereby corrected as shown below:

In the Claims

Claim 13, Column 4, Line 9:
Replace "first nut surf ace" with -- first nut surface --.

Claim 13, Column 4, Line 10:
Replace "second nut sur face to the third nut sur face" with -- second nut surface to the third nut surface --.

Claim 18, Column 4, Line 21:
Replace "the first nut surf ace" with -- the first nut surface --.

Signed and Sealed this
Twenty-sixth Day of August, 2025

Coke Morgan Stewart
*Acting Director of the United States Patent and Trademark Office*